(12) United States Patent
Nurmi et al.

(10) Patent No.: US 7,873,159 B2
(45) Date of Patent: Jan. 18, 2011

(54) PORTABLE ELECTRONIC APPARATUS (75) Inventors: Mikko Nurmi, Tampere (FI); Mikko Heino, Turku (FI)

(73) Assignee: Nokia Corporation, Espoo (FI)

( * ) Notice: Subject to any disclaimer, the term of this patent is extended or adjusted under 35 U.S.C. 154(b) by 1064 days.

(21) Appl. No.: 11/055,914

(22) Filed: Feb. 11, 2005

(65) Prior Publication Data

US 2006/0182272 A1 Aug. 17, 2006

(51) Int. Cl.
*H04M 9/00* (2006.01)
*H04M 1/00* (2006.01)

(52) U.S. Cl. ............................. 379/433.13; 455/575.3

(58) Field of Classification Search .................. 345/123, 345/156, 158, 684; 715/700, 864; 455/575.3; 379/433.13, 433.11
See application file for complete search history.

(56) References Cited

U.S. PATENT DOCUMENTS

| | | | | |
|---|---|---|---|---|
| 5,719,799 A | * | 2/1998 | Isashi | 708/105 |
| 5,956,398 A | | 9/1999 | Weadon et al. | 379/433 |
| 6,044,473 A | * | 3/2000 | Kim | 713/320 |
| 6,295,441 B1 | * | 9/2001 | Bjorkengren | 455/575.3 |
| 6,345,097 B1 | * | 2/2002 | Chintala et al. | 379/433.13 |
| 6,373,006 B1 | | 4/2002 | Toki | 200/61.7 |
| 6,492,974 B1 | * | 12/2002 | Nobuchi et al. | 345/156 |
| 6,700,775 B1 | | 3/2004 | Chuang et al. | 361/680 |
| 6,917,824 B2 | * | 7/2005 | Kobayashi | 455/575.3 |
| 2004/0130658 A1 | | 7/2004 | Yamaguchi et al. | 348/375 |
| 2005/0200596 A1 | | 9/2005 | Pihlaja | 345/156 |
| 2006/0155391 A1 | | 7/2006 | Pistemaa et al. | 700/17 |

FOREIGN PATENT DOCUMENTS

EP 0 995 208 B1 4/2000
EP 1293998 A2 3/2003

* cited by examiner

*Primary Examiner*—Fan Tsang
*Assistant Examiner*—Phylesha Dabney
(74) *Attorney, Agent, or Firm*—Harrington & Smith (57) ABSTRACT

A portable electronic apparatus, a mobile phone and a method of selecting a function in a portable electronic apparatus are disclosed. The portable electronic apparatus comprises a body and a lid pivotally mounted to the body with a hinge. Changes in the position of the lid around the hinge are detected and one of at least two possible functions available for a user is selected according to the detected change in the position of the lid.

22 Claims, 6 Drawing Sheets

PORTABLE ELECTRONIC APPARATUS

TECHNICAL FIELD OF THE INVENTION

This invention concerns a portable electronic apparatus and a mobile phone. Furthermore, the invention concerns a method of selecting a function in a portable electronic apparatus.

BACKGROUND ART

Portable electronic apparatuses such as mobile phones, mobile communicators and personal digital assistants comprise typically a body and a foldable lid mounted to a body by a hinge. The lid is commonly provided with a display screen and the body of the portable electronic apparatus is typically provided with a keyboard or buttons for entering data into the apparatus.

For selecting different functions, e.g. accessing to the applications of such apparatus the user is typically required to scroll through lists of menu options shown on the display screen. The user may select an option using buttons or a stylus.

Such known tools enable a reliable use of the applications but limit the degree of usability of the portable electronic apparatus. In order to switch between applications, it is required to physically locate and to press the desired button and not inadvertently to press a wrong, e.g. adjacent button. Alternatively, it may require a series of repetitious steps of pressing buttons by the user.

A potential disadvantage exists that the use of applications is experienced cumbersome to the user.

SUMMARY OF THE INVENTION

It is therefore an object of the invention to provide a portable electronic apparatus and a system for the portable electronic apparatus to provide a more intuitive and more adroit alternative to usage of applications of a portable electronic apparatus.

This object is achieved by a portable electronic apparatus, a mobile phone and a method according to independent claims, where the user can select among functions of the apparatus by changing the position of the lid around the hinge it is supported with.

A typical portable electronic apparatus of the invention, such as a mobile phone, a communicator device, a PDA (personal digital assistant), a portable computer, a digital camera or a video camera, comprises a body and a lid. The lid is pivotally mounted to the body with a hinge. With the word lid is meant in this text all sorts of lids or flips arranged to cover at least a part of the body of the apparatus when needed. A lid can also mean other parts pivotally connected to the body, e.g. a display of a video camera, which is freely rotatable around a hinge in relation to the body of the camera. A typical portable electronic apparatus also comprises electric means, such as a memory and some applications, such as computer programs, to be run on the electric memory. As is normal for e.g. digital devices and computer programs, the user of an electronic apparatus is often provided with a change to select one of at least two possible functions. Examples of such situations are numerous, e.g. one can select between directions of scrolling a document on the display screen of the apparatus. Often, when a computer program is being run, at least two possible functions are selectable simultaneously. The user of the apparatus of the invention can make his or her selection by moving the lid around its hinge in a certain direction. A typical portable electronic apparatus of the invention comprises an angle detector for detecting the change in the position of the lid around its hinge. In other words, the angle detector is arranged to detect a change in the angle between the body and the lid around a hinge. The angle detector is arranged to produce information on the change in the angle, which is sent via data communication means to a computer program run on the electric memory of the apparatus. This way the computer program can receive information of the user's selection among the possible functions according to a change in the position of the lid around its hinge, i.e. according to a change in the angle between the body and the lid.

In an embodiment of the invention the hinge, movement around which is detected, may be arranged to allow positioning of the lid to the body in:

- a closed position, where the lid is arranged against the body, and possibly locked releasably thereto; and
- at least one open position, where the angle between the body and the lid is different from the closed position.

Typically, the user of the apparatus of the invention can make his or her selection between at least two possible functions by moving the lid around its hinge when the lid is in an open position.

An embodiment of the invention comprises switching means for switching between applications being run on the portable electronic apparatus. With the switching means the applications are adapted to be switched by a change in angle between the lid and the body. I.e. movement of the lid is arranged to cause a switch between applications. The use of buttons is not necessarily required for switching. Thereby construction of the portable electronic apparatus can be simplified. Furthermore, this way navigating between applications is intuitive and rapid.

The invention can be used for selecting a function from a group of different selection situations confronted when using portable electronic apparatuses. E.g. scrolling through lists or documents or adjusting brightness of the display of the electronic apparatus is made easy and reliable with the present invention. Some possible individual actions taking place alone or in any suitable combination when selecting functions or switching between applications are e.g.: Activating one application, i.e. arranging this application to be displayed in front on the screen of the portable electronic apparatus; Deactivating an application, e.g. by minimizing its application window on the screen or by sending it behind another application window shown on the screen of the apparatus; Starting an application; Closing an application. Some possibilities for selections to be made according to the invention are:

- selecting one of at least two computer program applications to be active;
- selecting one of at least two predefined desk-views to be active;
- selecting one of at least two different views of one computer program to be active;
- selecting between zooming in or zooming out in an active application view;
- selecting between increasing or decreasing brightness or sharpness of the display of the electronic apparatus;
- selecting one of at least two predefined user profiles of the electronic apparatus to be active;
- selecting between different browsing or scrolling directions in a computer program application;
- selecting between different directions of turning a page in an electric book application;
- selecting between the "back" command and the "forward" command of an internet browser;

selecting between programs and/or documents previously used in the apparatus, i.e. browsing in the use history of the apparatus.

In a further embodiment of the invention, the switching means comprises a number of predetermined angles between the lid and the body of the portable electronic apparatus adapted to actuate the applications as the predetermined angles are detected. Such angles may vary within the limits of the opening angle of the lid. Preferably, the user may determine and set the ranges of the predetermined angles. An application is actuated when the lid is pivoted to the desired range of such angles.

In an embodiment of the invention, the apparatus comprises a hinge mechanism by which the lid is held at a desired position, so called operative position. E.g. the operative position can be a certain predetermined angle between the lid and the body of the portable electronic apparatus. Such mechanism may contain locking notches and/or grooves arranged in the portable electronic apparatus so that the lid can be releasably locked to its position. In order to angle the lid the notches and/or grooves may be spaced apart from each other in the direction into which the lid can be turned by the hinge. When the lid is not angled for accessing a new selection the lid is supported against the notches and/or grooves thereby holding it still. Particularly, the notches prevent the lid from pivoting undesirably around the hinge. In an embodiment of the invention, the portable electronic apparatus comprises a return spring means arranged to return the lid and the body back to the operational open position, if lid is turned a small amount away from the operational position. E.g. the aforementioned notches can function as such a return spring means. A limit angle can be predetermined e.g. with the form of the notches, after which the lid is not returned to the same operational position. There can be more than one of these operational positions. The return spring means can be arranged to give the user a suitable sensation of resistance, in order to make the use of the apparatus more comfortable and easy.

The angle detector can be arranged to produce a first information on the change in the angle if the lid is turned away from the operational open position towards a first direction, and a second information on the change in the angle if the lid is turned away from the operational open position towards a second direction. The computer program awaiting a selection to be made may be arranged to execute a first function if it receives the first information and arranged to execute a second function if it receives the second information. It is possible that the angle detector is arranged to produce information on a movement of the lid towards only one of said first and second directions.

In a further embodiment of the invention the functions to be selected from, e.g. switching between applications, are carried out in a desired order of applications by the switching means. The user may set the order of applications as desired, for example by programming. The portable electronic apparatus according to the invention may additionally operate user settings by default, with said settings enabling the user e.g. to switch applications or their views after opening the lid. The user may select which applications and in which order are to be selected or deselected, activated or deactivated according to the invention in the portable electronic apparatus. The order of applications or functions can be shown on the display screen of the portable electronic apparatus e.g. by a bar view. Predetermined colors can be dedicated to different functions thereby making the selection of applications or functions easier.

In one embodiment of the invention the electronic apparatus comprises more than one in different directions pivotable hinges between the body and the lid. E.g. the lid can first be opened around a first hinge arranged in a first direction and then the lid can be rotated around a second hinge arranged in a second direction. In some embodiments the first and second directions are perpendicular to each other. In some embodiments the lid can be freely rotatable around the second hinge. The angle detecting means of the invention can be arranged to detect the turning of the lid compared to the body around the first hinge or around the second hinge. Alternatively, there may be arranged angle detectors to detect the movement of the lid around both the first and second hinge.

Yet further embodiments of the invention have been specified in the dependent claims.

BRIEF DESCRIPTION OF THE DRAWINGS

The invention will now be described by way of examples with reference to accompanying schematical drawings, in which.

DESCRIPTION OF EMBODIMENTS IN THE DRAWINGS

Figure 1:
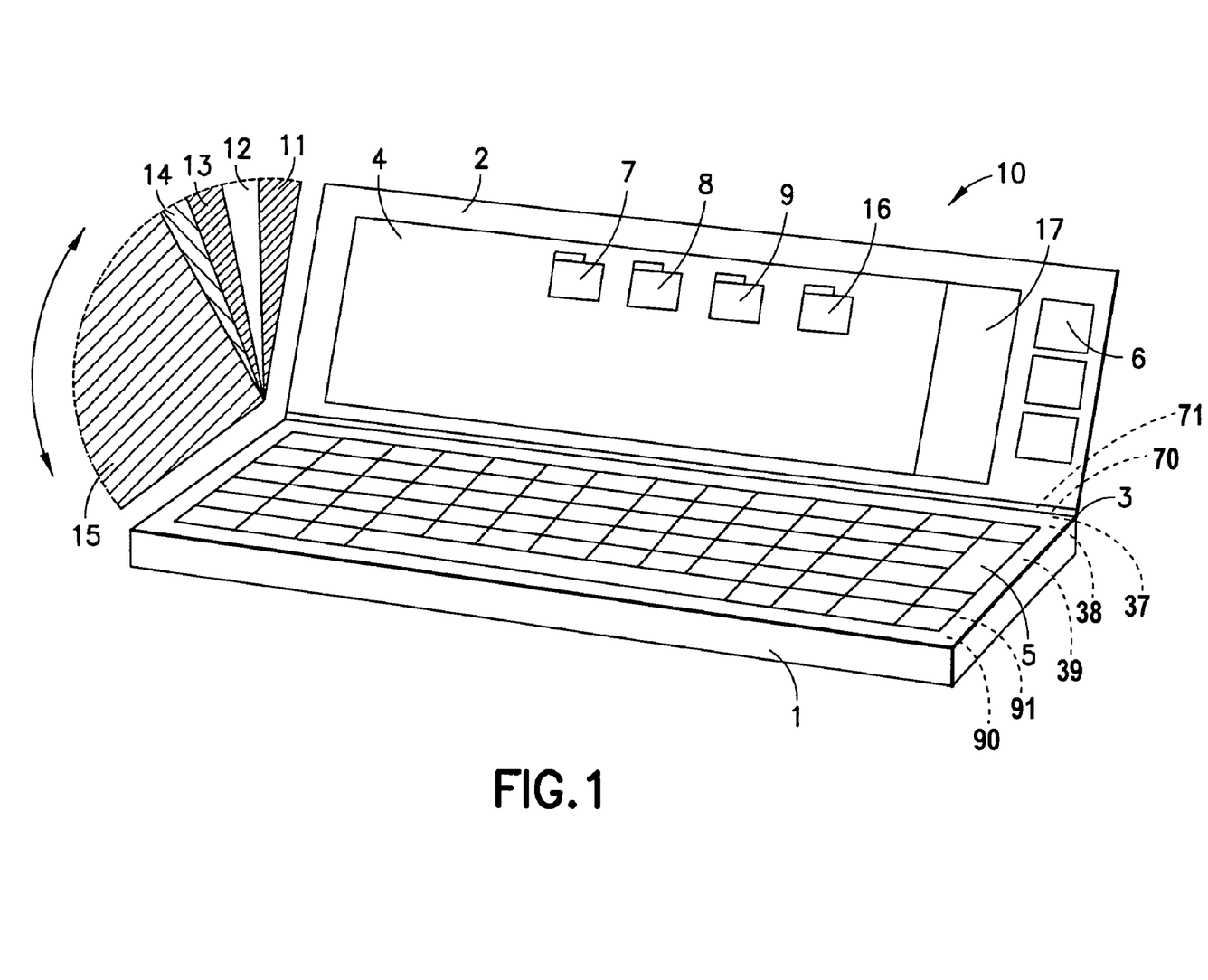
FIG. 1 depicts an example of a portable electronic apparatus according to the invention.

In FIG. 1, an example of a portable electronic apparatus according to an embodiment of the invention is depicted. The portable electronic apparatus 10, such as a mobile communicator or a mobile phone, comprises a body 1 and a lid 2 pivotally mounted to the body by a hinge 3. The lid 2 further comprises a display screen 4. Also depicted in FIG. 1 is a keyboard 5 alternatively referred to as buttons mounted to the body 1 of the apparatus 10. Furthermore, there can be other specific buttons 6 mounted to the lid 2 or to the body 1.

The portable electronic apparatus 10 includes different program applications, for example Internet browser 7, idle view 8, messaging, e.g. an email application 9 and telephone 16. The applications 7-9, 16 can be viewed on the display screen 4, for example by the buttons 5-6 or by a stylus or a mouse (not shown). The lid 2 is movable by the hinge 3 in the directions shown by an arrow. The display screen 4 also includes a bar view 17 wherein the applications 7-9, 16 are shown in a similar order as they are switched, for example in the form of text labels or icons. Also depicted in FIG. 1 are the exemplary turning angles of the lid. The ranges of such angles are shown by the filled sectors 11-15 between the lid 2 and the body 1 of the portable electronic apparatus 10. The presentation in FIG. 1 is only exemplary.

With further reference to FIG. 1, in order to enable the use of the portable electronic apparatus 10 it has to be switched on to work properly. The operation according to the portable electronic apparatus of one aspect of the invention is exemplarily described as follows. When the lid 2 is turned from the first sector 15 into the second sector 14 an application of Internet 7 is actuated. Furthermore, by turning the lid 2 from the second sector 14 to the third sector 13 the application of Internet 7 is deactivated and application of the idle view 8 is switched to be active. Furthermore, by turning the lid 2 from the third sector 13 to the fourth sector 12 the active application is switched from the application of idle view 8 to an application of messaging 9. Furthermore, by turning the lid 2 from the fourth sector 12 to the fifth sector 11 the application of messaging 9 is switched to an application of telephone 16. The first sector 15 is not used for activating any application in a way of the invention. In order to return previous applications 7-9, 16 the lid 2 is turned in opposite direction as shown by the arrow in FIG. 1.

One possible embodiment of the invention is that the when the lid 2 is closed, the apparatus 10 has its first application active, e.g. it can function as a mobile telephone or a digital camera if just the power is turned on. Then by just opening the lid 2 a predetermined first angle, e.g. between a range of 10-90 degrees, the apparatus has its second application active, e.g. it can then function as a speakerphone. And when opening the lid 2 further to a second predetermined angle, e.g. to a range between 95-180 degrees, the apparatus activates its third function, e.g. a portable computer 90.

Another possible embodiment of the invention is, that when the lid 2 is closed, the apparatus is functioning as a normal mobile phone. If the phone receives an incoming call, the call can be answered by opening the lid 2 to a predetermined angle. E.g. by opening the lid 2 into the first sector 15, the call is answered and the apparatus 10 can be used in handset mode, i.e. by holding the apparatus against the users ear and mouth. If the lid 2 is opened more than to the first sector 15, i.e. to the second, third, fourth or fifth sectors 11-14, the apparatus functions in handsfree mode. Moving the lid 2 between these two positions also switches the mode of call between the handset and the handsfree mode. Closing the lid 2 can be arranged to end the call. Naturally, it is possible to do the call control and mode switching in the traditional way by using keys 5-6.

Figure 2:
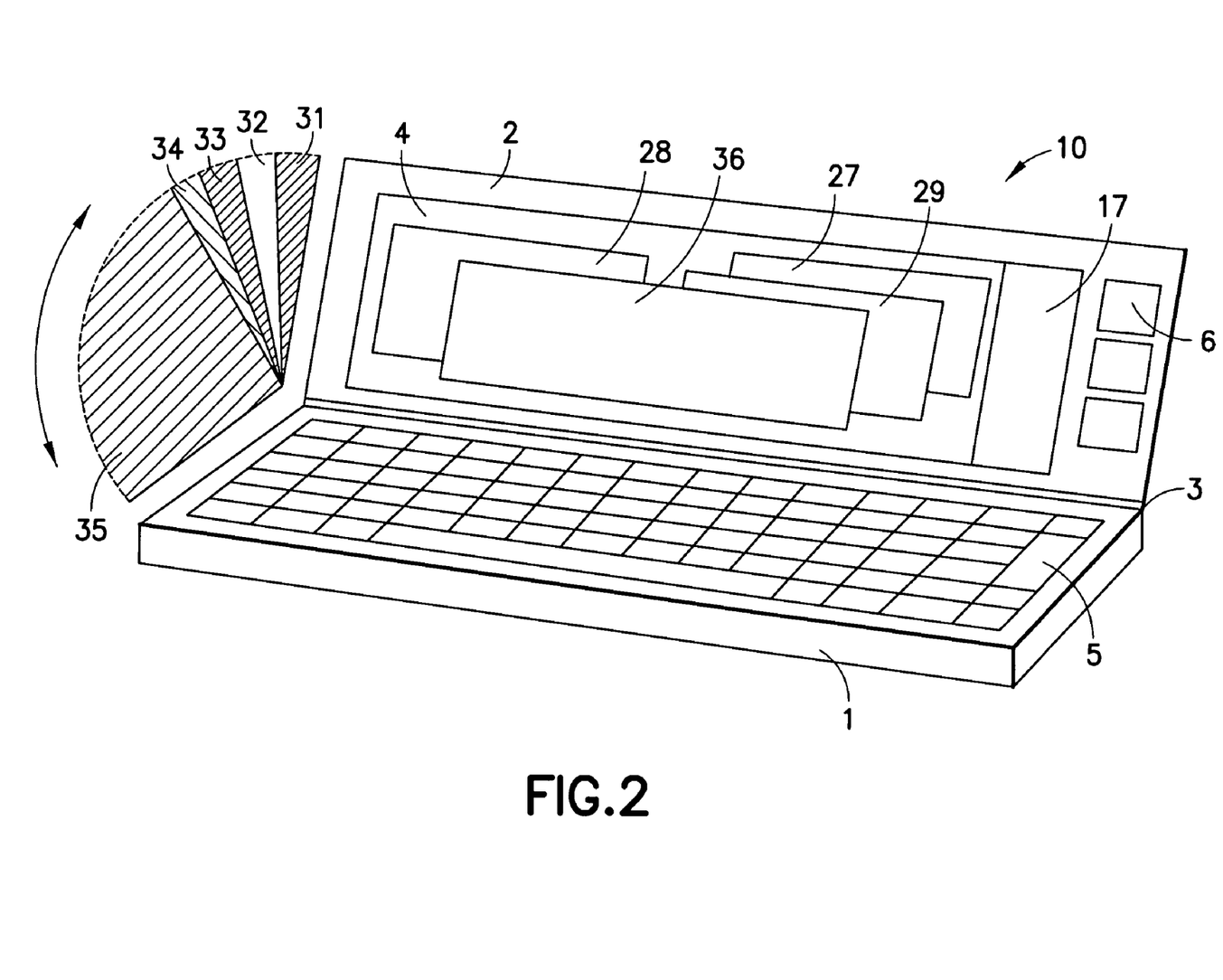
FIG. 2 depicts the portable electronic apparatus of FIG. 1 depicting a further embodiment of the invention.

Referring to FIG. 2, an example of a portable electronic apparatus according to the further embodiment of the invention presented in FIG. 1 is depicted. The invention can be utilized within an application selected by the user. If the application includes different views, pages, screens or sub-applications, accessing to them is carried out in a similar way than accessing to the applications 7-9, 16, as described above. Different views, for example referred as the first view 27, second view 28, third view 29 and fourth view 36, are shown in FIG. 2. The selection on which of the views 27-29, 36 of an application can be displayed as an active view or as the view on the front on the display screen 4 can be done in the traditional way by the buttons 5-6 or by a stylus or a mouse. The display screen 4 also includes a bar view 17 wherein the different views of an application are shown in a similar order as they are switched, for example by text or icons. The exemplary turning angles of the lid according to the invention are shown in FIG. 2 by the filled sectors 31-35. The sectors describe angles between the lid 2 and the body 1 of the portable electronic apparatus 10.

In order to switch between the different views 27-29, 36 of an application, for example the application of messaging 9, the application 9 must first be selected. The user may select the application 9 in the traditional way described above. After selecting application the lid 2 is turned into angles of the second sector 34 so that a first view 27 of messaging application 9 is actuated. Furthermore, by turning the lid 2 from angles of the second sector 34 into angles of the third sector 33 the second view 28 of messaging application 9 is actuated. Furthermore, by turning the lid 2 from the third sector 33 to the fourth sector 32 the third view 29 of messaging application 9 is actuated. Furthermore, by turning the lid 2 from the fourth sector 32 to the fifth sector 31 the fourth view 36 of messaging application 9 is actuated. The first sector 35 is not used for activating a view of the messaging application 9. In order to return to previous views 27-29, 36 the lid 2 is turned in opposite direction as shown by the arrow in FIG. 2.

Figure 6:
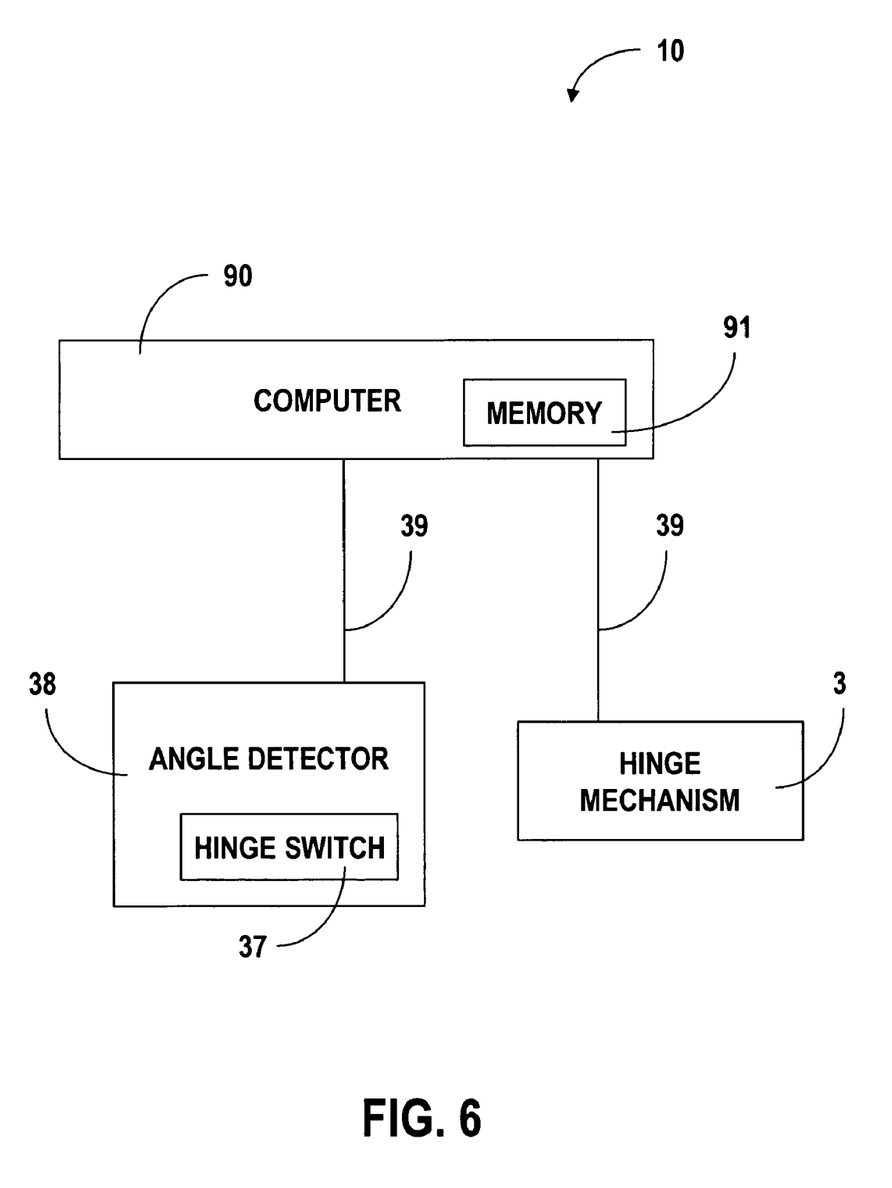
FIG. 6 depicts a schematic diagram illustrating components of the portable electronic apparatus of FIG. 1.

For detecting the changes the position of the lid around its angle the typical apparatus 10 of the invention comprises a hinge switch 37 or a detector 38 or equivalent (not shown). In one embodiment of the invention the angle detector 38 comprises the hinge switch (or switching means) 37. The hinge switch 37 is adapted so that the change in angle between the lid 2 and the body 1 can be detected. Thereby, the signaling is provided for the portable electronic apparatus 10 to perform the selections, e.g. actuate the applications 7-9, 16 or the views 27-29, 36 of a selected application. For example, the angle detector 38 is arranged to produce information on the change in the angle, which is sent via a data communicator (or data communication means) 39 to a computer program run on the electric memory 91 of the apparatus 10 (see FIG. 6).

The lid 2 may be releasably locked to one or more different operational open positions where the lid 2 and the body 1 are arranged to stay still without substantial help from the user. This may be accomplished e.g. by using notches or grooves 70 arranged in the hinge mechanism 3 of the portable electronic apparatus 10. The notches 70 may be spaced apart from each other so that the lid 2 can be pivoted to desired operational positions in order to switch applications 7-9, 16 or views 27-29, 36 of a selected application. Thus, the lid 2 is supported against the notches or grooves 70 and prevents it from pivoting harmfully during use.

In an embodiment of the invention, the portable electronic apparatus 10 comprises a return spring means 71 arranged to return the lid 2 and the body 1 back to the operational open position, if lid 2 is turned a small amount away from the operational position. E.g. the aforementioned notches 70 can function as return spring means 71. A limit angle can be predetermined e.g. with the form of the notches, after which the lid is not returned to the same operational position. There can be more than one of these operational positions. According to this aspect of the invention, the examples of FIG. 1 or FIG. 2 can be understood as comprising four operational positions. Referring now to the situation depicted in FIG. 2, when arranged in the first operational position, the lid 2 is situated releasably in the middle of the second sector 34. In the second operational position, the lid 2 is situated releasably in the middle of the third sector 33. In the third operational position, the lid 2 is situated releasably in the middle of the fourth sector 32. And in the fourth operational position, the lid 2 is situated releasably in the middle of the fifth sector 31. Every operational position has its limit angles, which are depicted in FIG. 2 as the borders between neighboring sectors.

For example, if the lid 2 is situated in the first operational position, i.e. in the second sector 34, the first view 27 of messaging application 9 is actuated, as described above. This first view can be e.g. an address book window. In this case, by moving the lid 2 just a bit into more open position, i.e. towards the third sector 33, the highlighted name in the address book is switched e.g. one step towards the beginning of the alphabetic. Similarly, by moving the lid 2 just a bit into more closed position, i.e. towards the first sector 35, the highlighted name in the address book is switched one step towards the end of the alphabetic. In both cases the notches in the hinge structure 3 return the lid 2 back to the middle of the second sector 34. The highlighted name can be selected e.g. by pressing the enter-button 5. Now, if the lid 2 is turned over the limit angle, i.e. over the border between the second sector 34 and the third sector 33, the second view 28 of the messaging application 9 is actuated. This second view 28 could be e.g. the window for writing the message, where slight moving of the lid 2 can e.g. be arranged to move the cursor between different text frames in a certain order.

Figure 3:
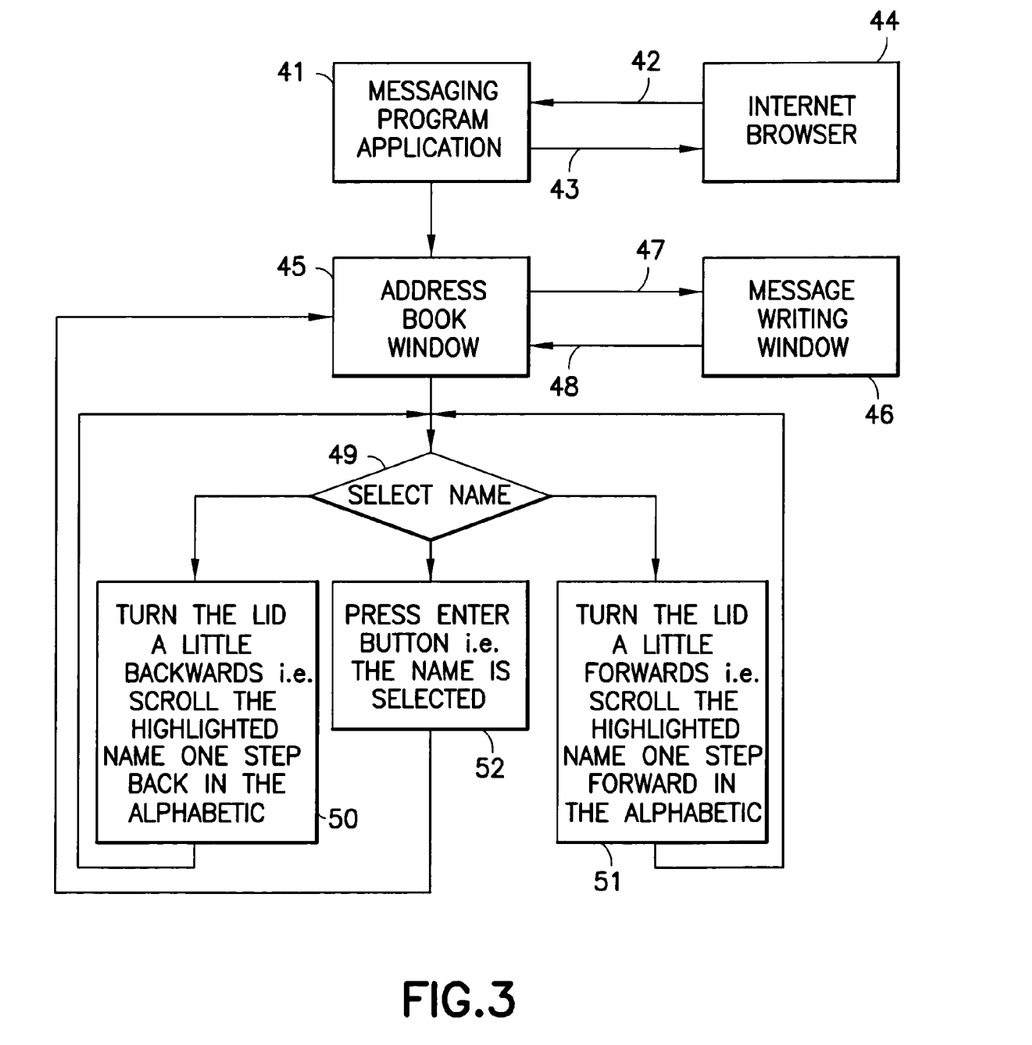
FIG. 3 depicts an embodiment of a method of the invention as a simplified flowchart.

The aforementioned method of selecting recipient names for a message is also depicted on FIG. 3 as a simplified flowchart of the functioning of the user interface used by the user of the apparatus 10. In step 41 the messaging program application 9 shown e.g. in FIG. 1 is selected. Arrows 42 and 43 describe the possibility of changing the active application to e.g. the Internet browser of step 44. After selecting the messaging program 9 one can select between different views of this application e.g. by moving the lid 2 forwards or backwards between suitable operational positions. E.g. positioning the lid in the angles of the second sector 34 of FIG. 2, the address book view is activated. Positioning the lid in the angles of the third sector 33 of FIG. 2, the message writing view is activated. Box 45 depicts the address book view 27 of FIG. 2 and box 46 depicts the message writing view 28 in FIG. 2. Arrows 47 and 48 describe the possibility of changing the active view between the address book view and the message writing view. If address book view is selected, the user proceeds to the name selection box 49 where the user has three alternatives to choose from:

Step 50: the user can turn the lid 2 a little backwards and this way scroll the highlighted name on the name list of the address book window one step back in the alphabetic;

Step 51: the user can turn the lid 2 a little forwards and this way scroll the highlighted name on the name list of the address book window one step forward in the alphabetic; or Step 52: the user can press enter button 5 of the apparatus 10 and this way select the highlighted name to be transferred to the recipient list of the message. By doing this the program goes back to the address book box 45 where the user can again select to look for another recipient by moving the lid slightly.

If the user now wants to switch into another view of the messaging application, this is done by moving the lid 2 forwards or backwards into another suitable operational position.

The inventive function selection methods can be combined and used in different ways. E.g. the selection between the messaging program step 41 and the Internet browser step 44 can be done by moving the lid 2 to a suitable operational position, dedicated to the wanted application. After the application is chosen the selection of the view can be done the same way as the name selection is described in FIG. 3, i.e. by moving the lid 2 slightly and pressing the enter button, when the wanted view is activated.

It should be noted that the relative size of the sectors 11-15, 31-35 and/or the order of the sectors might vary. FIGS. 1 and 2 show only some examples. The user may be allowed to modify the size and the order of the sectors. The apparatus 10 may comprise an application to allow the user to select a different number of applications or views of an application to function according to the invention as presented above. Furthermore, the user may select which applications or views are to be switched by a change in position of the lid around its hinge or a change in angle between the lid and the body of the portable electronic apparatus.

Figure 4:
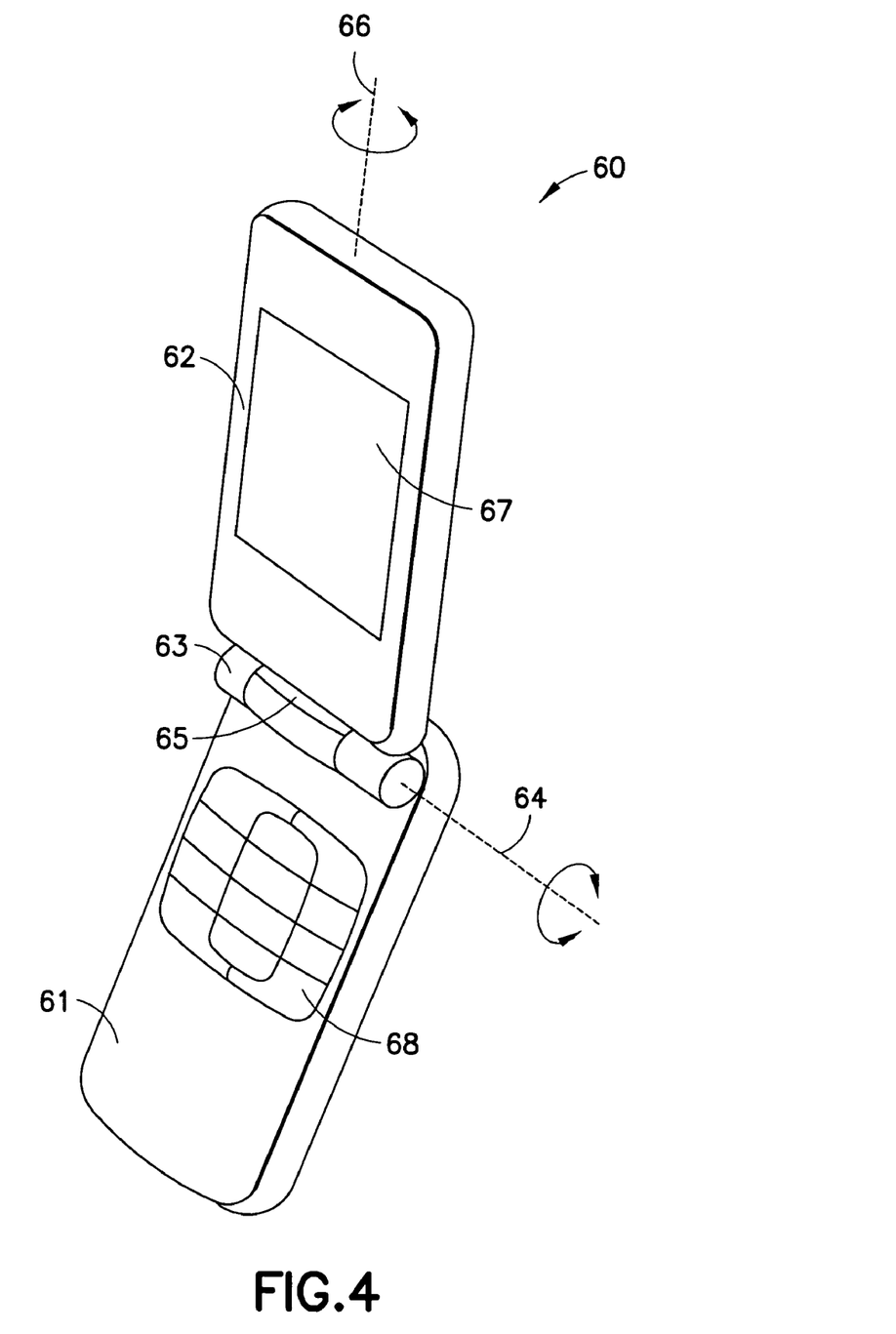
FIG. 4 depicts a further example of a portable electronic apparatus according to the invention.
Figure 5:
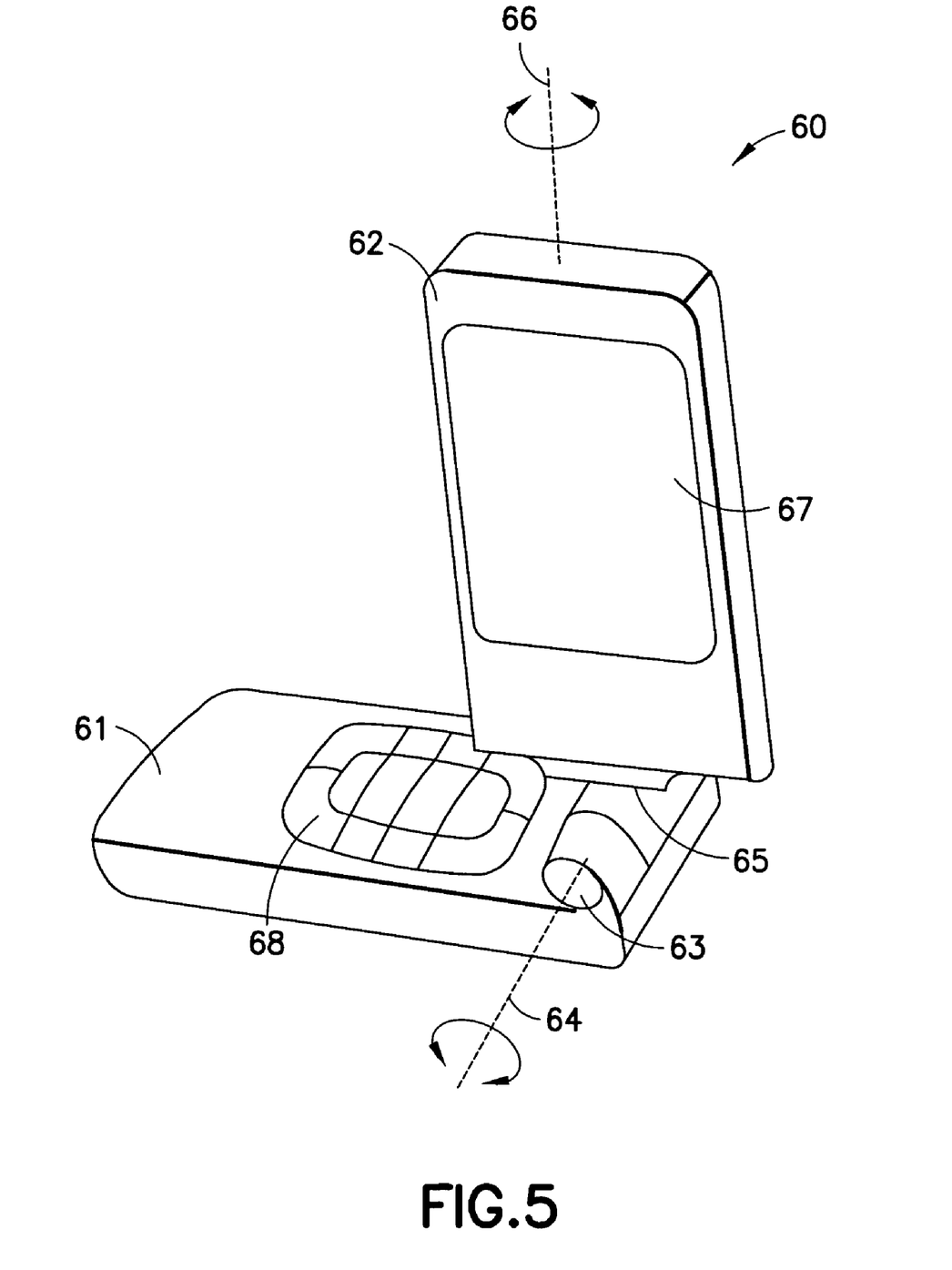
FIG. 5 depicts the portable electronic apparatus of FIG. 4 in an other position.

FIGS. 4 and 5 show an electronic apparatus 60 according to the invention. Apparatus 60 comprises a body 61 and a lid 62. The lid 62 is connected to the body 61 by a first hinge 63. The first hinge 63 is arranged to provide movement around a first axle 64 between a closed position, where the lid 62 is against the body 61, and various open positions, where the lid 62 and the body 61 are positioned in an angle relative to each other and detached from each other. FIG. 4 shows the apparatus 60 in an open position. The lid 62 is further connected to the body 61 by a second hinge 65. The second hinge 65 is arranged to allow the lid 62 to be rotated freely around a second axle 66. FIG. 5 shows the apparatus 60 in an open position where, compared to the situation in FIG. 4, the lid 62 has been rotated an angle around the second axis 66. Possible turning directions of the lid 62 are shown by arrows. The axles 64 and 66 are arranged approximately perpendicularly. Both the first and the second hinge 63 and 65 are provided with angle detectors arranged to provide information on the change in the position of the lid 62 compared to the body 61. The information on the change in the position of the lid 62 is fed into a computer program that is run in the electronic memory of the apparatus 60. Thus, the function of the apparatus 60 can be arranged to be controlled according to the invention with movement of the lid 62 around both hinges 63 and 65. The apparatus 60 comprises a display 67 in the lid 62 and a keyboard 68 in the body 61.

From the foregoing description it is readily understood that the portable electronic apparatus according to some embodiments of the invention makes it possible to increase the usability in design of such apparatuses.

While the invention has been shown and described with reference to certain embodiments thereof, these are merely provided to illustrate the invention and should not construed as limitations of the invention's scope. Thus, it will be understood by those skilled in the art that various modifications in the form and details can be made therein without departing from the spirit and scope of the invention.

The invention claimed is:

1. An apparatus comprising:
a body;
a lid pivotally mounted to the body with a hinge, around which hinge the position of the lid to the body is arranged to be changed, the position of the lid to the body defining an angle between them, the hinge being configured to allow positioning of the lid in at least two different angles around the hinge;
an angle detector configured to detect a change in the position of the lid around the hinge, the angle detector being configured to produce information on the change in the angle;
an electric memory and a computer program configured to be run on the electric memory, wherein the computer program is configured to provide at least two applications for a user to select from;
a data communicator configured to transfer the information on the change in the angle from the angle detector to the computer program, wherein the computer program is configured to receive information of the user's selection among the applications according to a change in the position of the lid around the hinge, wherein the computer program is configured to activate at least one of the applications in response to the change in position of the lid without additional input from the user;
wherein the apparatus comprises a mobile communication device;
wherein the computer program is configured to simultaneously display at least a portion of a first view and at least a portion of a different second view on a display screen of the mobile communication device, wherein the first view corresponds to one of the applications, wherein the second view corresponds to another one of the applications, and wherein the computer program is configured to arrange the first view in front of the second view when the at least one of the applications is activated.

2. An apparatus according to claim 1, wherein the hinge is arranged to allow positioning of the lid to the body in at least a closed position; and
at least one open position, where the angle between the body and the lid is different from the closed position.

3. An apparatus according to claim 2, wherein the hinge is configured to hold the lid and the body in at least one operational open position, in which position the lid and the body are arranged to stay without substantial help from the user.

4. An apparatus according to claim 3, wherein the apparatus comprises
a return spring arranged to return the lid and the body back to the operational open position, if the lid is turned less than a predetermined limit angle away from the operational open position around the hinge.

5. An apparatus according to claim 4, wherein
the angle detector is configured to produce a first information on the change in the angle if the lid is turned away from the operational open position towards a first direction, and
the angle detector is configured to produce a second information on the change in the angle if the lid is turned away from the operational open position towards a second direction.

6. An apparatus according to claim 1, wherein the computer program is configured to provide the at least two applications simultaneously.

7. An apparatus according to claim 1, wherein
the apparatus further comprises a switch configured to activate different applications according to the information on the change in the angle.

8. An apparatus according to claim 7, wherein
the computer program is configured to provide at least two possible program applications to be selected as an active application;
the data communicator is configured to transfer the information on the change in the angle to the switch, and wherein the switch is configured to switch active applications according to a change in the position of the lid around the hinge.

9. An apparatus according to claim 1, wherein the computer program is configured to provide at least two possible functions and the applications, and wherein the at least two possible functions and applications for a user to select from are selected by selecting at least one from the group of:
selecting one of at least two computer program applications to be active;
selecting one of at least two predefined desk-views to be active;
selecting one of at least two different views of one computer program to be active;
selecting between zooming in or zooming out in an active application view;
selecting between increasing or decreasing brightness or sharpness of the display of the mobile communication device;
selecting one of at least two predefined user profiles of the mobile communication device to be active;
selecting between different browsing or scrolling directions in a computer program application;
selecting between different directions of turning a page in an electric book application;
selecting between the back command and the forward command of an internet browser;
selecting between programs and/or documents previously used in the mobile communication device, for browsing in the use history of the mobile communication device.

10. An apparatus according to claim 1, wherein it comprises a number of predetermined positions of the lid around the hinge on which the computer program is configured to provide the at least two applications for a user to select from.

11. An apparatus according to claim 1, wherein the angle detector comprises a hinge switch.

12. An apparatus according to claim 1, wherein the different applications to be available for selection are arranged in a predetermined order of applications, which defines the applications possible for selection in each situation.

13. An apparatus according to claim 12, wherein the order of applications is shown on the display screen of the mobile communication device by a bar view.

14. An apparatus according to claim 12, wherein the applications arranged in the order of applications is selectable by the user.

15. An apparatus according to claim 1, wherein a predetermined computer program application is configured to be opened or closed at a predetermined angle between the body and the lid in an open position.

16. An apparatus according to claim 1, wherein predetermined computer program applications are configured to be opened in a predetermined order at predetermined positions of the lid around the hinge while the lid is moved into a first direction around the hinge.

17. An apparatus according to claim 1, wherein predetermined computer program applications are configured to be closed in a predetermined order at predetermined positions of the lid around the hinge while the lid is moved into a second direction around the hinge.

18. A mobile communication device comprising:
a body;
a lid pivotally mounted to the body with a hinge, around which hinge the position of the lid to the body is arranged to be changed, the hinge being arranged to allow positioning of the lid in at least two different angles around the hinge;
an angle detector for detecting a change in the position of the lid around the hinge, wherein the angle detector is configured to produce information on the change in the angle;
an electric memory and a computer program configured to be run on the electric memory, wherein the computer program is configured to provide at least two application windows on a display screen of the mobile communication device for a user to select from;
a data communicator configured to transfer the information on the change in the angle from the angle detector to the computer program, wherein the computer program is configured to receive information of the user's selection among the application windows according to a change in the position of the lid around the hinge, and wherein the computer program is configured to minimize at least one of the application windows on the display screen in response to the information;
wherein the providing of the at least two applications further comprises providing at least a first application window and a second application window, wherein at least a portion of the first application window and at least a portion of the second application window are simultaneously viewable on a display of the apparatus, wherein the activating of the one of the at least two applications further comprises activating the first application window, and wherein the activating of the first application window further comprises sending the second application window behind the first application window.

19. A mobile communication device according to claim 18, wherein the computer program is configured to provide at least two possible functions and the application windows, and wherein the at least two possible functions and the application windows for a user to select from are selected by selecting at least one from the group of:
- selecting one of at least two computer program applications to be active;
- selecting one of at least two predefined desk-views to be active; selecting one of at least two different views of one computer program £o be active;
- selecting between zooming in or zooming out in an active application view;
- selecting between increasing or decreasing brightness or sharpness of the display of the mobile communication device;
- selecting one of at least two predefined user profiles of the mobile communication device to be active;
- selecting between different browsing or scrolling directions in a computer program application;
- selecting between different directions of turning a page in an electric book application;
- selecting between the "back" command and the "forward" command of an internet browser;
- selecting between programs and/or documents previously used in the mobile communication device, i.e. browsing in the use history of the mobile communication device.

20. A method comprising:
providing at least two applications available for a user to select from;
detecting a change in a position of a lid around a hinge of a mobile communication device;
activating one of the at least two applications available for a user in response to the change in the position of the lid around the hinge, wherein the one of the at least two applications is activated when the change in the position is detected, and wherein the one of the at least two applications is activated without a button or key operation by the user after the change in the position is detected;
wherein the providing of the at least two applications further comprises providing at least a first application window and a second application window, wherein at least a portion of the first application window and at least a portion of the Second application window are simultaneously viewable on a display of the apparatus, wherein the activating of the one of the at least two applications further comprises activating the first application window, and wherein the activating of the first application window further comprises sending the second application window behind the first application window.

21. A method according to claim 20, further comprising providing at least two possible functions available for a user to select from, wherein the possible functions and the applications provided available for a user to select from are selected by selecting at least one from the group of:
- selecting one of at least two computer program applications to be active;
- selecting one of at least two predefined desk-views to be active;
- selecting one of at least two different views of one computer program to be active;
- selecting between zooming in or zooming out in an active application view;
- selecting between increasing or decreasing brightness or sharpness of the display of the mobile communication device;
- selecting one of at least two predefined user profiles of the mobile communication device to be active;
- Selecting between different browsing or scrolling directions in a computer program application;
- selecting between different directions of turning a page in an electric book application;
- selecting between the "back" command and the "forward" command of an internet browser;
- selecting between programs and/or documents previously used in the mobile communication device, i.e. browsing in the use history of the mobile communication device.

22. A non-transitory computer readable medium embodied with a computer program for performing operations to change program applications, the operations comprising: detecting a movement in a lid of a mobile communication device; providing a first information in response to the detected movement; minimizing a first application solely in response to the first information; displaying a second application solely, in response to the first information; and wherein the computer program is configured to simultaneously display at least a portion of a first view and at least a portion of a different second view on a display screen of the mobile communication device, wherein the first view corresponds to one of the applications, wherein the second view corresponds to another one of the applications, and wherein the computer program-is configured to arrange the first view in front of the second view when the at least one of the applications is activated.

* * * * *